April 19, 1938.  D. HOPPENSTAND  2,114,903
CLAMP
Filed June 11, 1936
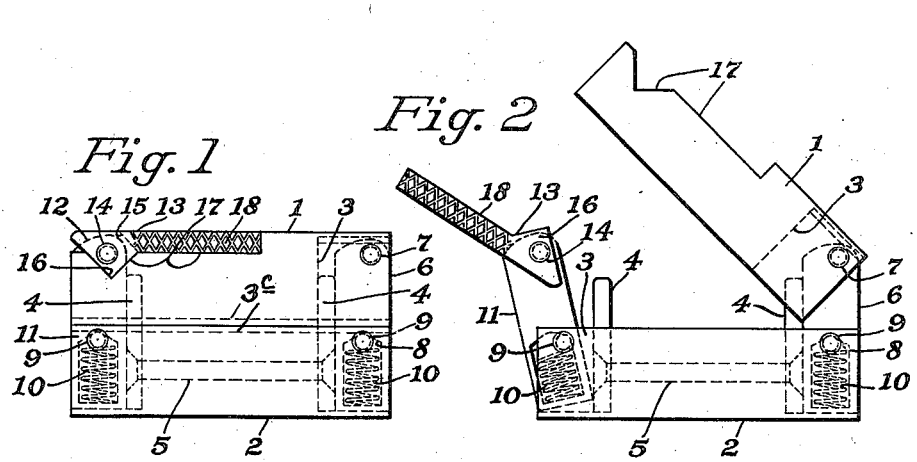
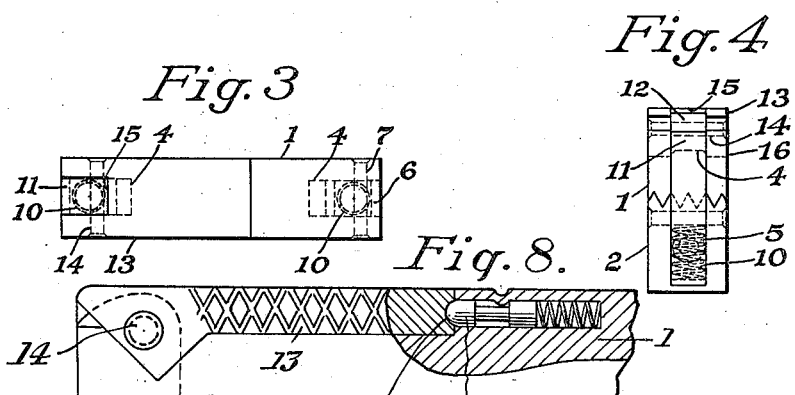
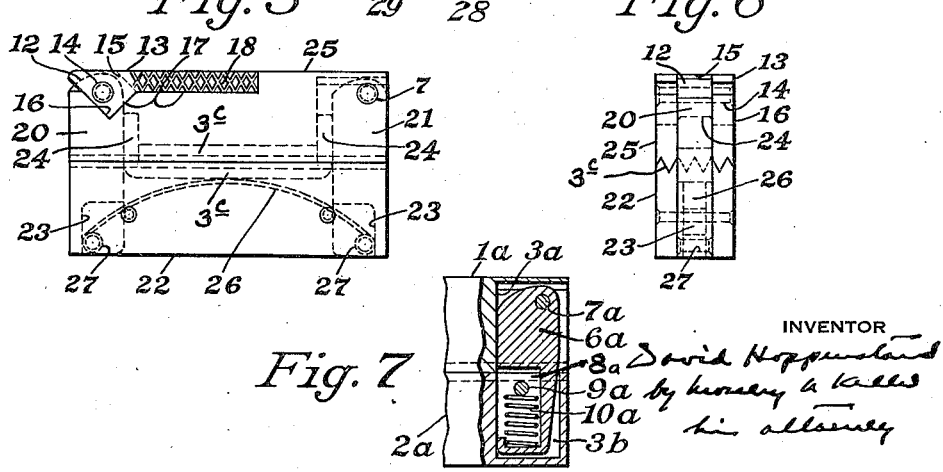
INVENTOR
David Hoppenstand
by Horsey & Kalb
his attorney Patented Apr. 19, 1938

2,114,903

UNITED STATES PATENT OFFICE 2,114,903

CLAMP

David Hoppenstand, Glenshaw, Pa., assignor to Mechanical Laboratories, Inc., a corporation of Pennsylvania Application June 11, 1936, Serial No. 84,711

8 Claims. (Cl. 128—346)

This invention relates to clamps and specifically to surgical clamps. One application of the invention is umbilical clamps and it will be described in detail with such application in mind.

Umbilical clamps as now manufactured are incapable of exerting a constant, positive pressure for any substantial length of time with the result that a severance of the umbilical cord is slow to heal. An object of my invention, therefore, is to provide a clamp adapted especially to compress and close the umbilical cord after severance with such a strong, constant pressure that healing thereof will be expedited.

The drawing forming part hereof illustrates a specific form of the invention although changes in the construction here disclosed may be made without varying the fundamental principle thereof.

Figure 1 is an elevational view of a clamp embodying my invention; Figure 2 is a similar view showing the clamp in open position; Figure 3 is a top plan view; Figure 4 is an end view; Figure 5 is an elevation view corresponding with Figure 1 but showing a modified form; Figure 6 is an end view of the clamp of Figure 5; Figure 7 is a fragmentary modified form of structure to be hereinafter referred to; and Figure 8 is another detailed sectional view showing lock and pin for holding the finger piece of the clamp.

The clamp of this invention consists principally of a pair of blocks 1 and 2, having cooperating serrated surfaces 3ᶜ. Each block has end recesses 3. Keepers 4 are secured in the recesses of the block 2 by a rivet 5.

A link 6 pivotally connects the blocks, being pivoted to the block 1 by a pin 7. The link is seated in the end recesses of the blocks. One end of the link (that which fits into the recess in the block 2) is milled out to provide a socket 8. A pin 9 extends across the recess in the end of the block 2, passing through the side walls thereof and the socket 8. A compression spring 10 is in abutment with the pin 9 and the bottom of the socket.

A link 11 releasably connects the other ends of the blocks 1 and 2 so that they may be opened or be spread apart for the insertion of the umbilicus therebetween. The lower end of link 11 is identical with that of link 6. The upper end of the link 11 is beveled at 12 and has a detent 13 pivoted thereto by a pin 14. The detent is recessed as at 15 to permit pivotal movement thereof on the link 11. The detent has depending ears 16 through which the pivot pin 14 passes. The block 1 is recessed at 17 to receive the ears 16 and the knurled operating end 18 of the detent.

In use, the detent 13 is manually swung outwardly, the spring 10 of the link 11 being compressed slightly thereby. The whole link is then pivoted about the pin 9 to clear the detent of the end of the block 1 so the clamp may be opened up by pivoting the blocks on the pins 7 and 9 traversing the link 6. This also may involve slight compression of the spring 10 in the link 6.

As shown in Figure 8 the clamp is provided with a spring pin 28 in the block 1 which cooperates with a small recess or depression 29 in the end of the finger piece of the detent 13, to lock the detent against displacement when the clamp is in use.

The clamp being thus opened, the umbilical cord or other part to be clamped, inserted therein, the reverse operation is then carried out. The keepers 4 limit the lateral spread of the umbilicus under pressure. As the clamp is closed, the springs 10 are compressed slightly, depending on the size of the member being clamped. When the blocks have been compressed on the cord, the link 11 may be swung into the end recess in the block 1 and the detent snapped into place to hold the clamp closed. As long as the clamp remains closed, the springs 10 continue to exert a strong, constant pressure tending to draw the blocks together. This uniform, positive pressure on the cord closes it effectively and considerably expedites healing of the umbilicus.

A modified form of the invention, shown in Figs. 5 and 6, comprises links 20 and 21 pivoted to a block 22 of generally channel section. The lower ends of the links are recessed inwardly as at 23. Keepers 24 are bent upwardly from the web of the channel block 22. A similar channel block 25 is pivoted to the link 21. The webs of the channel blocks cooperate to compress the cord between them. The link 20 is pivoted to the block 22 and cooperates with the block 25 in the same manner as the link 11 with the block 1.

A leaf spring 26 extends between pins 27 passing through the recesses 23 in the lower ends of the links 20 and 21. The central portion of the spring bears on the web of the channel block 22. It will be apparent that when the clamp is closed on a member such as an umbilical cord, the spring 26 will be deformed slightly and exert a constant force tending to draw the blocks 22 and 25 together.

In Figure 7 I have shown a modified form of clamp comprising blocks 1ᵃ and 2ᵃ having recesses $3^a$ and $3^b$. A link $6^a$ pivoted to block $1^a$ at $7^a$ is recessed, as at $8^a$, to receive a spring $10^a$ which is interposed between the bottom of the link $6^a$ and a pivot pin $9^a$.

It will be evident from the above description that the clamp of my invention is capable of exerting a steady, strong pressure on any member disposed between the clamping blocks thereof. By the aid of my clamp, it is possible to obtain satisfactory healing of an umbilical cord severance in four or five days, as compared to approximately twelve days necessary with clamps known previously.

Other forms of clamp utilizing the invention will occur to those skilled in the art to which it appertains. It is my desire to include all such within the language and scope of the appended claims.

I claim:

1. In a clamp, a pair of blocks, a link pivoted to both blocks, a link pivoted to one block and engageable with the other, and a spring mounted in each link and tending to oppose separation of said blocks resulting from closing them on a member disposed therebetween.

2. A clamp comprising a pair of cooperating clamping blocks, a link pivotally connecting said blocks adjacent their ends, a link pivoted to one of said blocks adjacent its other end and engageable with the other end of the other block, and spring means in each said links adapted to be compressed on separation of said blocks.

3. A clamp comprising a pair of clamping members, links pivoted thereto, one of said links being engageable with and dis-engageable from one of said members whereby the clamp may be closed and opened, and a plurality of springs cooperating with said links to oppose separation of said members.

4. A clamp comprising a pair of cooperating clamping members, and means comprising a plurality of links and springs providing a pivotal connection between said members and constituting means for yieldably opposing separation of said members.

5. In a clamp, a pair of blocks, a link pivoted to both blocks adjacent one end thereof, a second link pivoted to one of said blocks at the other end and having means for engaging the other end of said other block, a recess in one end of each link, and springs in said recesses compressed between one end thereof and means fixed to one of said blocks.

6. A clamp comprising a pair of blocks, a link pivoted to both blocks, a spring engaging an abutment fixed relative to said link and a second abutment fixed relative to one of said blocks, and a second link pivoted to one of said blocks and engageable with the other.

7. A clamp comprising a pair of blocks, a link pivoted to one of said blocks and engageable with the other, a spring engaging an abutment fixed relative to said link and a second abutment fixed relative to said one of said blocks, and a second link pivoted to both said blocks.

8. In a clamp, a pair of blocks, a link connecting said blocks, a pivot for said link on one block, a recess in said link into which said pivot extends, and a spring bearing on said pivot and said last mentioned block effective to urge each of the blocks toward the other.

DAVID HOPPENSTAND.